(No Model.)

J. HUNDGEBURTH.
DEVICE FOR FASTENING ADJUSTABLY PISTON RODS OR OTHER RODS TO THEIR CROSS HEADS.

No. 446,521. Patented Feb. 17, 1891.

WITNESSES:
Frank M. Saille
Rob.t Hardie

INVENTOR
Jean Hundgeburth
BY
Hubert A. Banning
ATTORNEY.

UNITED STATES PATENT OFFICE.

JEAN HUNDGEBURTH, OF NEW YORK, N. Y.

DEVICE FOR FASTENING ADJUSTABLY PISTON-RODS OR OTHER RODS TO THEIR CROSS-HEADS.

SPECIFICATION forming part of Letters Patent No. 446,521, dated February 17, 1891.

Application filed September 1, 1890. Serial No. 363,651. (No model.)

*To all whom it may concern:*

Be it known that I, JEAN HUNDGEBURTH, a citizen of the United States, and a resident of the city of New York, in the county and State of New York, have invented certain new and useful Improvements in Locking Devices for Adjustable Rods, of which the following is such a full, clear, concise, and exact description as will enable others skilled in the art to which my invention appertains to make and use the same, reference being had to the accompanying drawings, forming part of this specification.

In various machines and parts of machines it is necessary to make use of rods having one threaded end screwed into a correspondingly-threaded socket. In such instances the adjustment of the length of the rod outside of the socket is made by screwing the threaded end more or less into the part having the socket to receive it. This is particularly true of the piston-rod of a gas or air compressor, which is frequently screwed into the cross-head of the compressor, or that part which connects with the engine for actuating the rod and with it the piston by back and forth movements called the "forward stroke" and the "back-stroke," the gas being admitted to the compressor during the back-stroke and compressed by the forward or compression stroke. The relation between the piston and the clearances or space for its movements within the compressor is such as to require a very nice adjustment of the length of the piston-rod. The manner in which the rod is connected to the cross-head is not such as to make it an easy matter to reliably secure the piston-rod when adjusted to the length required by any of the ordinary and well-known nut-locks or like devices.

The object of my invention is to provide a locking device for adjustable rods and which will be more especially applicable for use in regulating the length of the piston-rod of compressors.

The invention consists in the construction and arrangement of the rod and the cross-head or part which receives it, so as to provide means by which a nice adjustment and locking of the rod may be effected.

Figure 1:
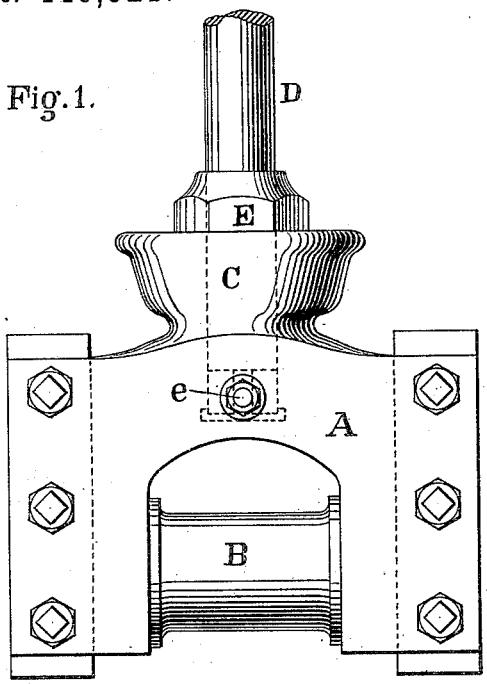
Figure 2:
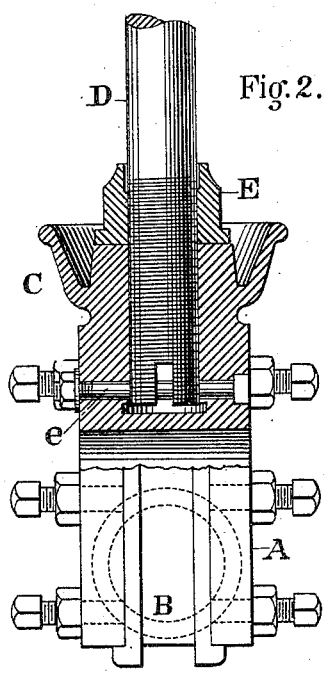
Figure 3:
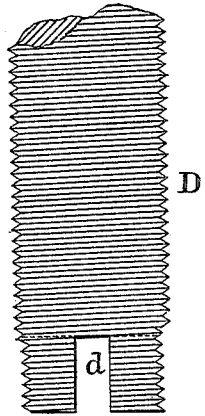
Figure 4:
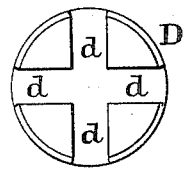

In the accompanying drawings, Figure 1 is a front view of the cross-head of a compressor, showing a portion of the piston-rod, the threaded end and locking device being indicated by dotted lines in said figure. Fig. 2 is an end view of the lower part of the cross-head and a sectional view of the upper part and of the drip-cup and jam-nut, and shows a portion of the rod, while Fig. 3 shows the portion of the rod which is threaded and shown as provided at the end which enters the cross-head with slots or grooves for receiving a locking bolt or key; and Fig. 4 is a plan view of the end of the rod, showing also the transverse or right-angled slots for receiving the locking-bolt when in position with relation to the cross-head.

In the drawings, A represents the cross-head; B, the cross-head pin for attaching it to the connecting-rod of the actuating mechanism; C, the drip or oil cup for receiving the lubricant or surplus oil, which may be carried below the compressor by the piston-rod, or which may drip or work its way through any clearance around it.

D represents the piston-rod, and E the jam-nut, which is screwed on the threaded portion before the rod is screwed down into the correspondingly-threaded socket or opening in the cross-head.

The piston-rod D is slitted or slotted preferably in transverse or opposite directions, as indicated by the spaces $d$. The cross-head is also bored transversely and centrally through the threaded socket for receiving the rod D, and at a point which will come in line with the slotted portions of the rod. When the piston-rod has been screwed into place, a properly-fitted bolt $e$ is passed through the opening bored in the cross-head and through a slot in the rod, being then secured by nuts or in any desired manner. The bolt $e$ prevents the rod from turning in either direction, and by having the slots in the rod transversely it may be secured at a quarter-turn and admit an adjustment of the length of the piston-rod in variations of, say, one thirty-second of an inch without danger of the rod in any manner becoming loosened or its length changed while performing the work of carrying the piston which compresses the gas. Such a construction and arrangement of the rod and cross-head, while permitting a very nice adjustment of the length of the piston-rod in relation to the compressor-heads, also acts to effectually secure it in a fixed position without change or disturbance by the rapid and continued movements of the same when the machine is being operated.

I have described my improvement in its relation to compressor piston-rods, because of the difficulty which has heretofore been experienced in effecting a nice adjustment and rigid attachment of the same to the cross-head, as well as to the piston, at a fixed position; but the improvement is applicable to other adjustable rods where similar difficulties exist.

Having thus described my invention, what I claim as new, and desire to secure by Letters Patent, is—

1. A locking device for adjustable rods, consisting of a rod slotted or slitted and having a threaded end, in combination with a part having a correspondingly-threaded socket or opening into which said rod is screwed, the part having such socket being provided with an opening transversely to the same, and a bolt or key passed through said opening and through said slotted portion of the rod, substantially as and for the purpose set forth.

2. In locking devices for piston-rods, the combination of a rod having a threaded end and transverse slots or grooves, a cross-head having a threaded socket or opening into which said rod is screwed, said cross-head being also provided with an opening transversely to its threaded socket, and a bolt or pin passed through the opening in said cross-head and through one of the slots or openings in the piston-rod, whereby said rod may be adjusted and secured, substantially as set forth.

JEAN HUNDGEBURTH.

Witnesses:
 OWEN V. HUGHES,
 FRANK M. CAILLE.